US012210609B2

(12) United States Patent
Goyal et al.

(10) Patent No.: US 12,210,609 B2
(45) Date of Patent: Jan. 28, 2025

(54) CENTRAL CONTROLLER FOR MULTIPLE DEVELOPMENT PORTS (71) Applicants: STMicroelectronics Application GmbH, Aschheim-Dornach (DE); STMicroelectronics International N.V., Geneva (CH)

(72) Inventors: Avneep Kumar Goyal, Greater Noida (IN); Thomas Szurmant, Munich (DE)

(73) Assignees: STMicroelectronics Application GMBH, Aschheim-Dornach (DE); STMicroelectronics International N.V., Geneva (CH)

( * ) Notice: Subject to any disclaimer, the term of this patent is extended or adjusted under 35 U.S.C. 154(b) by 483 days.

(21) Appl. No.: 17/515,149

(22) Filed: Oct. 29, 2021

(65) Prior Publication Data
US 2023/0133385 A1 May 4, 2023

(51) Int. Cl.
G06F 21/85 (2013.01)
G06F 11/36 (2006.01)
G06F 21/31 (2013.01)
G06F 21/44 (2013.01)
G06F 21/45 (2013.01)
G06F 21/71 (2013.01)

(52) U.S. Cl.
CPC ............ *G06F 21/44* (2013.01); *G06F 11/364* (2013.01); *G06F 21/31* (2013.01); *G06F 21/45* (2013.01); *G06F 21/71* (2013.01); *G06F 21/85* (2013.01)

(58) Field of Classification Search
CPC ........ G06F 21/44; G06F 11/364; G06F 21/31; G06F 21/45; G06F 21/71; G06F 21/85; G06F 15/7807; G06F 21/604
See application file for complete search history.

(56) References Cited

U.S. PATENT DOCUMENTS

| 5,504,801 | A  | 4/1996  | Moser et al.     |
| 5,832,263 | A  | 11/1998 | Hansen et al.    |
| 6,418,386 | B1 | 7/2002  | Wong-Lam et al.  |
| 7,549,069 | B2 | 6/2009  | Ishihara et al.  |
| 7,592,974 | B2 | 9/2009  | Suzuki et al.    |
| 9,489,284 | B2 | 11/2016 | Ghica et al.     |
| 9,705,914 | B2 | 7/2017  | Di Pietro et al. |
| 10,037,212 | B2 | 7/2018 | Porosanu         |
| 10,070,390 | B2 | 9/2018 | Patel et al.     |
| 10,178,110 | B2 | 1/2019 | Kareti           |

(Continued)

FOREIGN PATENT DOCUMENTS

| CN | 102595411 A | 7/2012 |
| CN | 103445762 A | 12/2013 |
| CN | 107065754 A | 8/2017 |

*Primary Examiner* — Shaqueal D Wade-Wright
(74) *Attorney, Agent, or Firm* — Slater Matsil, LLP (57) ABSTRACT A system on a chip including a first-port controller for a first development port configured to receive a first development tool and a second-port controller for a second development port configured to receive a second development tool. The system on a chip further including a central controller in communication with the first-port controller, the second-port controller, and a security subsystem. The central controller being configured to manage authentication exchanges between the security subsystem and the first development tool and authentication exchanges between the security subsystem and the second development tool.

22 Claims, 8 Drawing Sheets

(56) References Cited

U.S. PATENT DOCUMENTS

| | | |
|---|---|---|
| 10,193,438 B2 | 1/2019 | Mohan |
| 10,374,869 B2 | 8/2019 | Jain |
| 10,381,109 B2 | 8/2019 | Hong et al. |
| 10,667,727 B2 | 6/2020 | Mostafavi et al. |
| 10,878,113 B2* | 12/2020 | Benson .................. G06F 21/12 |
| 2010/0263043 A1* | 10/2010 | Xu ......................... G06F 11/26 726/17 |
| 2013/0290785 A1* | 10/2013 | Truong ............... G06F 11/2733 714/30 |
| 2013/0325388 A1 | 12/2013 | Joensuu |
| 2013/0325998 A1* | 12/2013 | Hormuth ................ H04L 41/06 709/212 |
| 2015/0033294 A1 | 1/2015 | Fevrier |
| 2015/0278058 A1* | 10/2015 | Kurts ................ G06F 11/3476 714/30 |
| 2016/0028750 A1 | 1/2016 | Di Pietro et al. |
| 2017/0235971 A1 | 8/2017 | Kline et al. |
| 2017/0318039 A1 | 11/2017 | Kareti |
| 2017/0364676 A1 | 12/2017 | Paaske et al. |
| 2018/0007074 A1 | 1/2018 | Kune et al. |
| 2019/0052617 A1* | 2/2019 | Chen ..................... H04L 9/3234 |
| 2019/0238574 A1 | 8/2019 | Iliofotou et al. |
| 2019/0274560 A1 | 9/2019 | Zalevsky et al. |

\* cited by examiner

CENTRAL CONTROLLER FOR MULTIPLE DEVELOPMENT PORTS

TECHNICAL FIELD

The present invention relates generally to systems and methods to implement a central controller serving multiple debug access ports and to secure systems on a chip from tool falsification attacks.

BACKGROUND

Generally, a system on a chip (SoC) can prevent attacks by tool falsification by using an authentication protocol managed by a security subsystem. However, current approaches can leave a SoC vulnerable after an authentication has occurred.

SUMMARY

In accordance with an embodiment, a SoC includes a first-port controller in communication with a first development port configured to receive a first development tool; a second-port controller in communication with a second development port configured to receive a second development tool; a security subsystem; and a central controller in communication with the first-port controller, the second-port controller, and the security subsystem, the central controller being configured to manage authentication exchanges between the security subsystem and the first development tool and authentication exchanges between the security subsystem and the second development tool.

In accordance with an embodiment, the SoC may further include a password exchange mailbox for the first-port controller and a password exchange mailbox for the second-port controller.

In accordance with an embodiment, the password exchange mailbox for the first-port controller includes a register location accessible to the security subsystem to write authentication-exchange data and accessible to the first development tool via the first-port controller to read authentication-exchange data.

In accordance with an embodiment, the password exchange mailbox for the first-port controller includes a register location accessible to the security subsystem to read authentication-exchange data and accessible to the first development tool via the first-port controller to write authentication-exchange data.

In accordance with an embodiment, the password exchange mailbox for the second-port controller includes a register location accessible to the security subsystem to write authentication-exchange data and accessible to the second development tool via the second-port controller to read authentication-exchange data.

In accordance with an embodiment, the password exchange mailbox for the second-port controller includes a register location accessible to the security subsystem to read authentication-exchange data and accessible to the second development tool via the second-port controller to write authentication-exchange data.

In accordance with an embodiment, the security subsystem includes a core that is configured to write authentication-exchange data to the register locations accessible to the security subsystem to write authentication-exchange data.

In accordance with an embodiment, the core is configured to authenticate authentication-exchange data read from the register locations accessible to the security subsystem to read authentication-exchange data.

In accordance with an embodiment, the core is configured to authenticate authentication-exchange data read from the register locations accessible to the security subsystem repeatedly at predetermined intervals.

In accordance with an embodiment, the central controller includes a static password exchange mailbox including: a register location accessible for reading authentication-exchange data by the security subsystem and accessible for writing authentication-exchange data by both the first development tool via the first-port controller and the second development tool via the second-port controller; and a register location accessible for writing authentication-exchange data by the security subsystem and accessible for reading authentication-exchange data by both the first development tool via the first-port controller and the second development tool via the second-port controller; and wherein the core is configured to authenticate authentication-exchange data read from the static password exchange mailbox.

In accordance with an embodiment, the security subsystem includes an access-granted output to assert an access-granted signal, the access-granted signal being provided to the first-port controller and the second-port controller, the access-granted signal being de-asserted in response to any authentication-exchange data being unauthenticated.

In accordance with an embodiment, the SoC further includes a trace and debug subsystem accessible by a trace and debug interface of the first-port controller and accessible by a trace and debug interface of the second-port controller, the first-port controller and the second-port controller being configured to open their trace and debug interfaces in response to the access-granted signal being asserted.

In accordance with an embodiment, the central controller comprises an independent reset.

In accordance with an embodiment, the security subsystem is configured to repeatedly initiate authentication exchanges with the first development tool and repeatedly initiate authentication exchanges with the second development tool.

In accordance with an embodiment, a method to authenticate development tools for a system on a chip (SoC), the method includes coupling a first development tool with a first development port of the SoC; authenticating the first development tool using data exchanged between the first development tool and a security subsystem via a first dedicated password exchange mailbox of a central controller; coupling a second development tool with a second development port of the SoC; and authenticating the second development tool using data exchanged between the second development tool and the security subsystem via a second dedicated password exchange mailbox of the central controller.

In accordance with an embodiment, the method further includes performing a one-time authentication process using data exchanged between the first development tool and the security subsystem via a static password exchange mailbox.

In accordance with an embodiment, the method further includes repeatedly authenticating the first development tool using data exchanged between the first development tool and the security subsystem via the first dedicated password exchange mailbox of the central controller.

In accordance with an embodiment, the method further includes repeatedly authenticating the second development tool using data exchanged between the second development tool and the security subsystem via the second dedicated password exchange mailbox of the central controller.

In accordance with an embodiment, the method further includes granting access to the first development tool and the second development tool to a trace and debug subsystem of the SoC in response to the first development tool and the second development tool having been authenticated.

In accordance with an embodiment, the method further includes denying access to the first development tool and the second development tool to a trace and debug subsystem of the SoC in response to either one of the first development tool or the second development tool failing an authentication protocol.

In accordance with an embodiment, a central controller for a SoC includes a first dedicated password exchange mailbox configured to manage authentication data exchanges between a first development tool coupled with the SoC and a security subsystem of the SoC; a second dedicated password exchange mailbox configured to manage authentication data exchanges between a second development tool coupled with the SoC and the security subsystem of the SoC; and a static password exchange mailbox to configured to manage authentication data exchanges between the first development tool and the security subsystem and manage authentication data exchanges between the second development tool and the security subsystem of the SoC.

In accordance with an embodiment, the central controller further includes an output to provide an access-granted signal, the access-granted signal being asserted in response to authentication protocols being satisfied for the first dedicated password exchange mailbox, the second dedicated password exchange mailbox, and the static password exchange mailbox.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Usage of SoCs in different products has grown to near ubiquitous level across an array of industries. SoCs are used in too many products to even attempt to name. In many cases, SoCs are tested, calibrated, and debugged for the specific application where they are incorporated. Calibration, testing and debugging can be especially important when SoCs are employed in critical or sensitive applications. One such non-limiting example being the automotive industry. SoCs are used in a variety of automotive applications including engine control, and body and chassis applications. SoCs are often tested and calibrated by Original Equipment Manufactures. SoCs may also be tested or calibrated once in-field for diagnostic or other purposes.

Calibration, debugging, and testing may be performed using development tools coupled with development ports of a SoC. Multiple development ports are needed in some SoCs because various types of tools may be needed to be connected simultaneously. In the automotive industry, some examples of development tools include Trace & Debug tools and Engine Calibration tools. Car manufacturers or OEMs may need to connect multiple tools to perform calibration tasks when a debugger tool is already connected to debug the ongoing operations. Multiport SoCs may also be desirable in many other circumstances when it is beneficial to utilize more than one development tool at a time.

Security for SoC with single or multiple development ports is becoming increasingly important. As the number, and types, of applications for SoC increase, the potential security threats and the need to protect SoC from hacking attacks also increases. Successful attacks may misappropriate confidential information from developers. Attacks can also compromise the functionality of an application. This becomes particularly problematic in sensitive and critical applications for SoC like the automotive industry.

Known approaches to addressing security for multiport SoCs typically utilize a security subsystem with authentication protocols to confirm the identity of a development tool. However, after completing authentication for one external tool connected to one of the multiple development ports, the SoC security subsystem opens access for all other external development tools connected to any other development port without additional verification protocols for each of the tools connected to one of the multiple ports. This one-time authentication process leaves the SoC exposed to tool-falsification attacks that allow unauthorized tool access to the SoC internals without passing verification protocols.

For example, a legitimate development tool can be connected at a first development port. At the same time, a hacking device may be coupled with a different one of the multiple development ports of the SoC. When the legitimate device coupled with the first development port clears authentication protocols, the security subsystem opens access to all the development ports. This clears a pathway to the SoC internals for a hacking device coupled to a different one of the development ports.

Vulnerabilities from traditional security approaches can also be exploited by swapping a legitimate device with a hacking device. A legitimate development tool may be connected at a development port of a SoC. The development tool may be authenticated with a one-time authentication protocol. A security subsystem then grants access for all the development ports of the SoC. The authentic development tool may then be removed from the development port and replaced with a hacking device, which will then have access to the SoC internals.

Other known approaches to protect a SoC from attack by a development tool coupled with a development port include using a pre-defined password. This only offers limited protection because a pre-defined password may be discovered and used during a hacking attack to grant unwanted access to a hacking tool received by a development port.

To combat tool-falsification risks, there is a need for a SoC with a central controller that is accessible by all the development ports. The central controller provides an ability to facilitate authentication exchanges (such as password exchanges and challenge password exchanges) between devices coupled with the development ports and a security subsystem. The central controller may allow individual development ports to be independently authenticated on a repeated basis.

Figure 1:
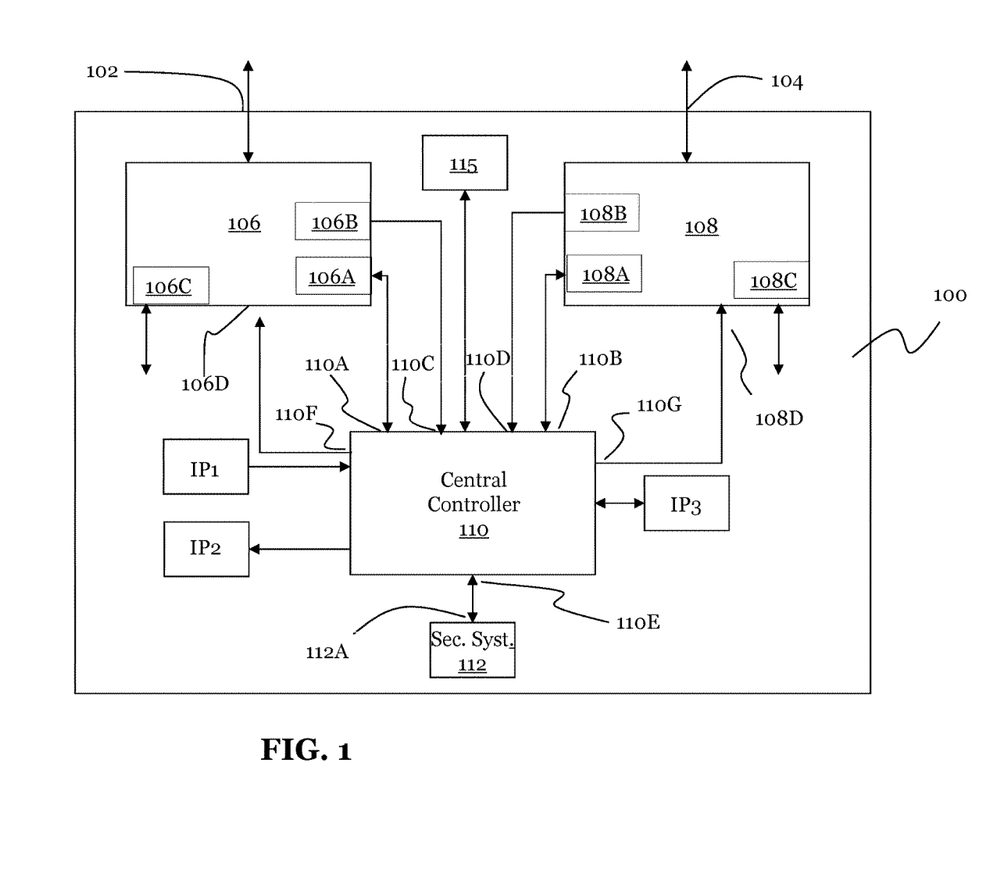
FIG. 1 depicts a multiport System on a Chip with a Central Controller in accordance with embodiments.

FIG. 1 shows a multiport System on a Chip with a Central Controller in accordance with embodiments.

In various embodiments, a system on a chip ("SoC") 100 may comprise a first development port 102 and a second development port 104. The first development port 102 may comprise an interface to exchange data with a development tool such as, but not limited to, a debug and trace tool or a calibration tool for the SoC 100. Likewise the second development port 104 may comprise an interface to exchange data with a development tool such as, but not limited to, a debug and trace tool or a calibration tool for the SoC 100. Development tools may be connected with the first development port 102 and the second development port 104 simultaneously. The SoC 100 may also comprise additional development ports in various embodiments. Any number of development ports may be included on a SoC 100. Development ports may comprise, for example, Joint Test Action Group ("JTAG") ports, and Serial Wire Debug ("SWD") ports. The development ports may also comprise other standards or customized access ports.

It should be appreciated that various components described in this disclosure are referenced with numerical terms such as "first," "second," "third," etc. These terms are used to identify components. They should not be read to denote an order unless otherwise specified or indicated.

It should also be noted that the figures of this disclosure may represent components as blocks. However, the blocks are used to illustrate the components and do not necessarily represent the physical boundaries of a component. As will be appreciated, various components may be made up of elements distributed at different physical locations on a SoC.

The first development port 102 may transmit data to and from a development tool by means of a bus. Busses are denoted in FIG. 1 and in the other figures of this disclosure by lines or arrows between components. The arrows denote a direction of a data flow between components. For example, a double-headed arrow between components indicate two-way data exchange or two-way bus.

Data may be transmitted from the first development port 102 to a first-port controller 106. Data may also be transmitted from the first-port controller 106 to a device (such as a development tool) coupled with the first development port 102. The first-port controller 106 may comprise a circuit or logic, in various embodiments.

The second development port 104 may also transmit data to and from a development tool by means of a bus. Data may be transmitted from the second development port 104 to a second-port controller 108 and vice verse. Data may be transmitted to a device coupled with the second development port 104 from the second-port controller 108. The second-port controller 108 may comprise a circuit or logic, in various embodiments.

In various embodiments, the SoC 100 may comprise additional port-controllers for additional development ports. In various embodiments, each additional development port may have a corresponding port controller or the port controllers may be combined into a signal unit.

The SoC 100 may also comprise a central controller 110. The central controller 110 may communicate with the first-port controller 106, the second-port controller 108, and any additional port controllers for additional development ports. Communication between the central controller 110 and port controllers may be accomplished by means of a bus. As will be appreciated, couplings between inputs, outputs, and other interfaces between components of the SoC 100 may be accomplished by means of connections to a bus whereby data is transmitted to and from components. Placement of central controller may be such that it does not reset when rest of the debug and reset subsystem is under reset. The central controller 110 may perform many tasks required for functioning of a debugger. In various embodiments, the central controller 110 may comprise status bits which store SoC life-cycle, current and last reset and self-test completion status.

In various embodiments the first-port controller 106 may comprise a read/write interface 106A that is coupled with a read/write interface 110A of the central controller 110. In various embodiments, the first-port controller 106 may further comprise an output 106B that is coupled with an input 110C of the central controller 110 or to the other components inside the SoC. In various embodiments, input 110C and 110D may communicate connection status of a development tool. A development tool coupled with the first development port 102 may communicate with the central controller 110 via the first-port controller 106 to initiate an authentication exchange.

In various embodiments the second-port controller 108 may comprise a read/write interface 108A that is coupled with a read/write interface 110B of the central controller 110. In various embodiments, the second-port controller 108 may further comprise an output 108B that is coupled with an input 110D of the central controller 110. The second-port controller 108 may be configured to assert a signal when a development tool coupled with the second development port 104. And, as with the first-port controller, a development tool coupled with the second development port 104 may communicate with the central controller 110 via the second-port controller 108 to initiate an authentication exchange.

Additional ports controllers may also comprise read/write interfaces coupled with read/write interfaces of the central controller 110. And, active signal outputs from additional port controllers may also be provided to inputs of the central controller 110 to assert active signals when development tools have been paired with the respective ports. This may also initiate authentication protocols.

The SoC 100 may further comprise a security subsystem 112. The security subsystem may provide numerous functions for a SoC. In various embodiments, the security subsystem 112 may comprise a core, and memory elements (such as a non-transitory computer readable medium) that are separate from other components of the SoC. This isolation may help protect the security subsystem from attacks. The security subsystem may store cryptographic keys in dedicated memory locations.

In various embodiments, the central controller 110 may manage authentication exchanges between the security subsystem 112 and development tools coupled with development ports. For example, the central controller 110 may manage authentication exchanges between a development tool paired with the first development port 102. Data may pass from the first development port 102 through the first-port controller 106 and to the central controller 110.

Similarly, the central controller 110 may manage authentication exchanges between a development tool paired with the second development port 104. Data may pass from the second development port 104 through the second-port controller 108 and then to the central controller 110. The central controller 110 may also manage authentication exchanges between additional tools paired with additional development ports by way of corresponding port controllers.

The central controller 110 may also comprise a read/write interface 110E for communication with the security subsystem 112. The interface 110E may be used to transmit data to the security subsystem 112. The security subsystem 112 may communicate that an authentication challenge has been passed to central controller 110 over the interface 110E. Port 115 may be used for reading and writing memory locations inside central controller 110 from a Host CPU of the SoC. In various embodiments, the host CPU may also serve as the CPU for security subsystem 112 too. The SoC may comprise multiple CPUs.

The security subsystem 112 may also comprise a read/write interface 112A to receive password exchange information from the central controller 110. The security subsystem 112 may communicate that a password exchange has succeeded to the central controller 110 from the interface 112A. The security subsystem 112 may also read and write into central controller 110 via port 115 Signals may also be routed to other component parts of the central controller 110 once received at the port 115 by means of internal bussing our couplings. Port 115 may be used to provide access to registers of central controller 110. The security subsystem 112 may access registers of the central controller 110 via this port. The security subsystem 112 may be coupled to port 115 by a bus.

The central controller 110 may also be in communication with various IP circuits for performance of various tasks. For example, the SoC 100 may comprise a first IP circuit IP1, a second IP circuit IP2, and a third IP circuit. The SoC 100 may also include additional IP circuits. The first IP circuit IP1 may be coupled by a bus with the central controller 110. The central controller 110 may exchange data with the first IP circuit. Likewise, the second IP circuit IP2 may be coupled with the central controller 110. And, the third IP circuit IP3 may also be coupled with the central controller 110. IP1, IP2 and others may communicate with Central Controller 110 to provide the status of a SoC when acting in various phases of application. These also may receive control information from central controller 110, for example, to control the development ports IOs (for example, first development port 102 and second development port 104) so the ports are reserved for a development tool when a development tool is connected. Another IP may comprise a system clock controller. In various embodiments, the central controller 110 may communicate with a clock controller to switch off the clocks until a password challenge is successful.

In various embodiments, the central controller 110 may also be connected with the central process unit of the SoC 100. For example, port 115 may provide an interface between the central controller 110 and other components of the SoC such as CPUs. The central controller 110 may comprise two-way interface to with a system memory map by way of port 115 for CPU access.

The central controller 110 may allow more secure usage of development tools on a SoC. By having a central controller 110 independent of the security subsystem 112, the other components of the SoC may be reset without resetting the central controller 110. In this way the central controller 110 may remain unchanged when system resets are performed. It also may be advantageous to have a reset of the central controller 110 independent from other components of a SoC because the central controller may be performing functions to help debugging failures inside SoC. Accordingly, the central controller 110 may not reset when remaining SoC gets reset. Special reset of central controller 110 may decide its placement in SoC. Resets may be received (at a port) by the central controller from a reset generation module of the SoC.

In various embodiments, development tools coupled with any of the development ports may be blocked access to the other parts of the SoC 100. For example, the first-port controller 106 may comprise an interface 106C with access to other SoC systems (for example a Trace and Debug Subsystem (not shown)). However, the interface 106C may remain inaccessible to a development tool paired with the first development port 102 until the authentication protocols are satisfied.

In various embodiments, authentication status may be communicated from the central controller 110. The central controller 110 may comprise an output 110F to assert an access-granted signal when authentication protocols are met. The access-granted signal may be received at an input 106D of the first-port controller 106. The first-port controller 106 may then open the interface 106C to a development tool paired with the first development port 102. As will be appreciated, the access-granted signal may open access to other parts of the SoC system in a variety of ways.

Similarly, the second-port controller 108 may comprise an interface 108C with access to other SoC systems (like a Trace and Debug Subsystem (not shown)). The interface 108C may remain inaccessible to a development tool paired with the second development port 104 until the authentication protocols are satisfied.

Again, in various embodiments, this may be communicated from the central controller 110. The central controller 110 may comprise an output 110G to assert an access-granted signal when authentication protocols are met. The access-granted signal may be received at an input 108D of the second-port controller 108. The second-port controller 108 may then open the interface 108C to a development tool paired with the second development port 104. Additional port controllers may provide access for development tools to other systems of the SoC (like a Trace and Debug Subsystem) in a similar manner.

In various embodiments, the central controller 110 may comprise multiple password exchange mailboxes. The central controller 110 may comprise a dedicated password exchange mailbox for each development port of a multiport SoC. This may allow development tools at the different development ports to be authenticated separately.

Figure 2:
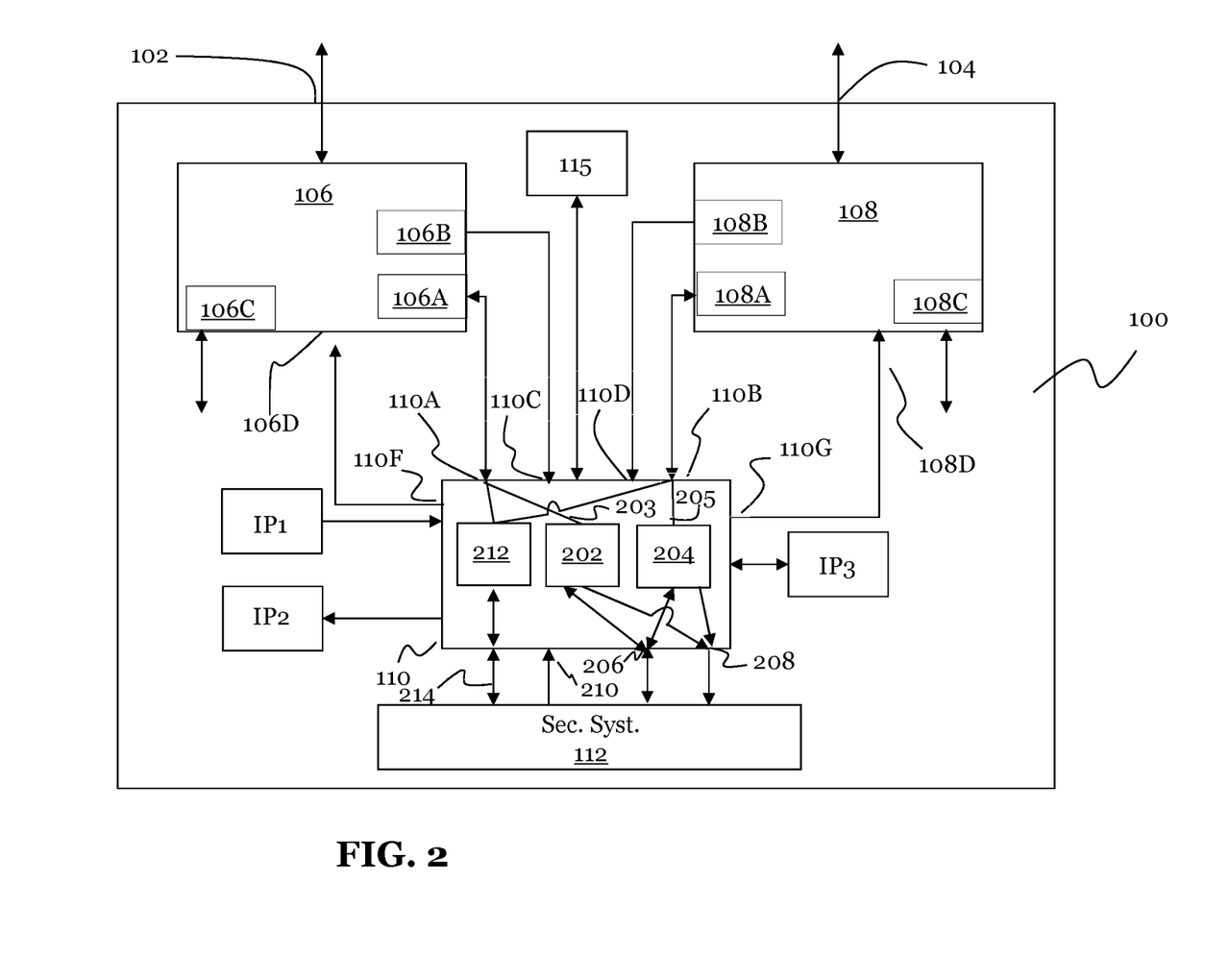
FIG. 2 depicts a multiport System on a Chip with a Central Controller comprising dedicated password exchange mailboxes in accordance with embodiments.

FIG. 2 depicts a multiport System on a Chip with a Central Controller comprising dedicated password exchange mailboxes in accordance with embodiments.

In various embodiments, the central controller 110 comprises a first dedicated password exchange mailbox 202 for the first-port controller 106 and a second dedicated password exchange mailbox 204 for the second-port controller 108. The central controller 110 may also comprise additional password exchange mailboxes dedicated for additional port controllers. The central controller 110 may comprise a password exchange mailbox for every development port of a SoC 100.

In various embodiments, the first dedicated password exchange mailbox 202 may comprise programmable registers for storing data received from the first-port controller 106. Such data may originate from a development tool coupled with the first development port 102. The first dedicated password exchange mailbox 202 may also programmable register for writing data by security subsystem 112. The first dedicated password exchange mailbox 202 may also be configured so that the first-port controller 106 may read data written in the memory location accessible for writing by the security subsystem 112 in the first dedicated password exchange mailbox 202. Likewise, the first dedicated password exchange mailbox 202 may be configured so the security subsystem 112 may read data written by the first-port controller 106 in the memory of the first dedicated password exchange mailbox 202. For read and write exchanges to occur, the first dedicated password exchange mailbox 202 may be in communication with the interface 110A and the interface 110E. In various embodiments, the first dedicated password exchange mailbox 202 may receive data from only one of the port controllers. This allows the central controller 110 to manage authentication exchanges between a development tool coupled with the first development port 102 and the security subsystem.

In various embodiments the second dedicated password exchange mailbox 204 may operate in a similar way. For example, the second dedicated password exchange mailbox 204 may comprise programmable registers for storing data received from the second-port controller 108. Such data may originate from a development tool coupled with the second development port 104. The second dedicated password exchange mailbox 204 may also comprise programmable register for writing data by the security subsystem 112. The second dedicated password exchange mailbox 204 may also be configured so that the second-port controller 108 may read data written in the memory location accessible by the security subsystem 112 for writing in the second dedicated password exchange mailbox 204. Likewise, the second dedicated password exchange mailbox 204 may be configured so the security subsystem 112 may read data written by the second-port controller 108 into a memory location of the second dedicated password exchange mailbox. For read and write exchanges to occur, the second dedicated password exchange mailbox 204 may be in communication with the interface 110B and the interface 110E. The foregoing allows the central controller 110 to manage authentication exchanges between a development tool coupled with the second development port 104 and the security subsystem 112.

Additional dedicated password exchange mailboxes may also manage data exchanges between tools received by additional development ports. Data exchanges can flow bi-directionally to and from a development tool by way of a port controller, and the central controller 110.

It may also be beneficial to structure the central controller 110 so the dedicated mailboxes only receive data from one of the port controllers. For example, the first dedicated password exchange mailbox 202 may be limited to receiving data only from the first-port controller 106. The second dedicated password exchange mailbox 204 may be limited to receive data only from the second-port controller 108. In various embodiments, the first dedicated password exchange mailbox 202 may only receive a communication bus 203 coupled with the first-port controller 106 and no other port controllers. The second dedicated password exchange mailbox 204 may only receive a communication bus 205 coupled with the second-port controller 108 and no other port controllers. The communication bus 203 and the communication bus 205 may provide read access and write access to the first-port controller 106 and the second-port controller 108 to respective dedicated password exchange mailboxes. As will be appreciated, additional password exchange mailboxes may be limited to only receive communications from a corresponding port controller. This is advantageous because it reduces or eliminates the chance that a development tool received by another development port can infiltrate the SoC.

In various embodiments, the central controller 110 may comprise an access interface 206 for the password exchange mailboxes. The access interface 206 may be coupled by internal bussing to dedicated password exchange mailboxes of the central controller 110. The access interface 206 may be coupled externally with a read/write bus that is coupled with the security subsystem 112. This may provide a path for the security subsystem 112 to read and write to the first dedicated password exchange mailbox 202 and the second dedicated password exchange mailboxes.

The central controller 110 may also comprise an interrupt interface 208 to receive and transmit interrupts to the password exchange mailboxes from the security subsystem 112 and from the password exchange mailboxes to the security subsystem 112. Interrupts may be generated when data is written or read from the memory locations of the password exchange mailboxes.

In various embodiments, an access granted signal generated by the security subsystem 112 may be received by the central controller 110 at an interface 210. When asserted, the access-granted signal may be provided to output 110F and to output 110G. From there, it may be provided to the first-port controller 106 and the second-port controller 108. As will be appreciated, it may also be provided to additional outputs for additional port controllers. The access-granted signal may also be delivered to port controllers by other pathways or may circumvent the central controller 110.

The access-granted signal may be asserted by the security subsystem 112 after the security protocols for authenticating a development tool have been satisfied. This may occur, for example after challenge-response exchange has been met by a development tool. In various embodiments, the access-granted signal may be de-asserted if any port has received an unauthenticated tool, or a tool at any port has failed an authentication protocol. For example, access may be revoked for an authenticated development tool received at the first development port 102 after an unauthenticated development tool has been received at the second development port 104, or a development tool received by the second port 104 has failed an authentication protocol. In various embodiments, every development tool received at any of a SoC's development ports must be authenticated for the any of the development tools to have open access. Access may be re-established if the development tool received at the second development port 104 is authenticated.

Dedicated mailboxes for each development port may allow tools received at each of the development ports to be authenticated independently. This may prevent tool-falsification attacks where authentic tool at on development port opens access for all development ports.

An additional layer of security may be provided by a static password exchange mailbox 212. A static password exchange mailbox 212 may provide reading access and writing access to each of the port controllers of the SoC 100. For example, the static password exchange mailbox may be coupled with the read/write interface 110A and the read/write interface 110B. The static exchange password mailbox may also be coupled with interfaces for any additional port controller to provide read/write access to the static password exchange mailbox 212. The static password exchange mailbox 212 may also provide read/write access to the security subsystem 112. The central controller 110 may comprise a read/write interface 214 to provide access for the security subsystem 112. In this way, a development tool paired with any of the development ports may initiate and satisfy an authentication protocol for the static password exchange mailbox 212. In various embodiments the static exchange mailbox may only be used for one-time authentication protocols.

In various embodiments, the access-granted signal may only be asserted after an authentication protocol for the static exchange mailbox 212 has been satisfied and an authentication protocol is satisfied a dedicated password exchange mailboxes for each development port receiving a development tool. A one-time authentication may be required followed by dedicated authentication to open access. This may provide two layers of security from attacks.

Dedicated password exchange mailboxes also allow authentication exchanges to be performed on a continuing basis. The security subsystem 112 may be configured to require a development tool to satisfy an authentication protocol at intervals. The length of the intervals may be predetermined. For example, a development tool received at the first development port 102 may be required to satisfy an authentication protocol every 200 millisecond. The authentication protocol may comprise challenge-response authentication. If the development tool fails to pass the authentication protocol, access to SoC 100 internals may be revoked for some or all of the development ports. As will be appreciated, in various embodiments, this may be accomplished by de-asserting, by the security subsystem 112, the access-granted signal.

Additional development tool received at the second development port 104 may also simultaneously be required to satisfy continuing authentication protocols every 200 milliseconds. The foregoing may prevent authenticated tools being replaced with hacking devices.

In various embodiments, a central controller 110 may be employed in a SoC with only one development port. The two layers of security provided by the central controller 110 comprising a password exchange mailbox and a static exchange mailbox may prevent attacks that occur after an authentic development is switched with an inauthentic tool.

Figure 3:
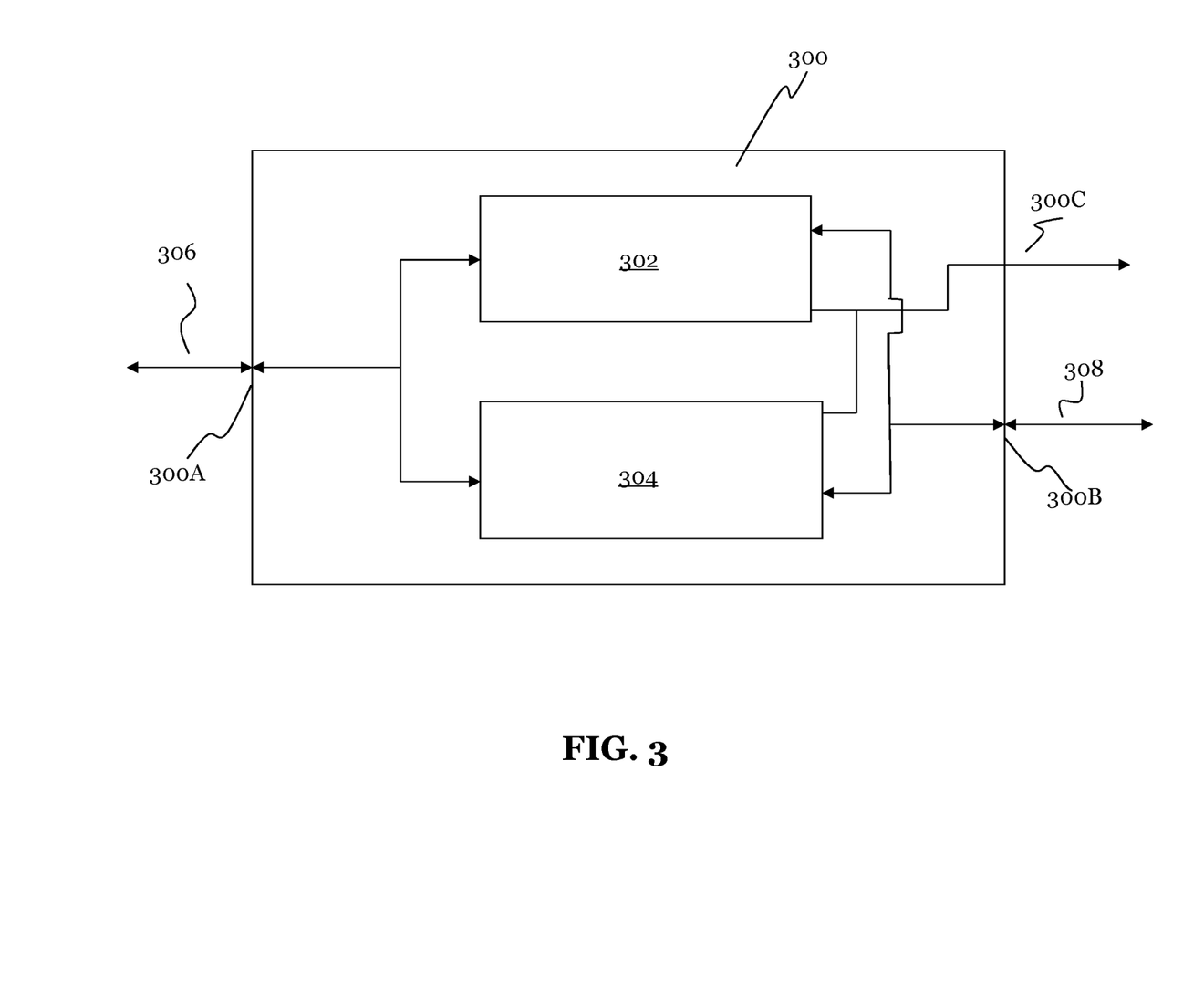
FIG. 3 depicts a dedicated password exchange mailbox consistent with embodiments.

FIG. 3 depicts a dedicated password exchange mailbox of an embodiment.

A dedicated password exchange mailbox 300 may allow authentication exchanges between a tool received at a given development port of a SoC 100 and the security subsystem 112. For example, the first dedicated password exchange mailbox 202 may comprises a dedicated password exchange mailbox for the first development port 102. The second dedicated password exchange mailbox 204 may comprises a dedicated password exchange mailbox for the second development port 104, and so on.

The dedicated password exchange mailbox 300 may comprise a first memory location 302 and a second memory location 304. The first memory location 302 may comprise a register location or programmable register location. The second memory location 304 may comprise a register location or programmable register location. The first memory location 302 and the second memory location 304 may be used to store data during authentication exchanges between the security subsystem 112 and development tools received at a corresponding port. For example, the first memory location 302 may be accessible to the security subsystem 112 to write authentication-exchange data and accessible a development tool received by first development port 102 via the first-port controller to read authentication-exchange data. The second memory location 304 may be accessible to the security subsystem 112 to read authentication-exchange data and accessible to development tool received by the first port via the first-port controller 106 to write authentication-exchange data. As will be appreciated, a dedicated password exchange mailbox may be configured so it can be read and written to by the second development port 104 or any other development port.

The dedicated password exchange mailbox 300 may receive a read/write bus 306 from a port controller. This may be received at read/write interface 300A. The dedicated password exchange mailbox 300 may receive a read/write bus 308 at an interface 300B. The read/write bus 308 may be received from the security subsystem 112.

The read/write bus 306 may allow a development tool received at a corresponding development port to write encrypted or non-encrypted data to the second memory location 304. It may also allow a development tool coupled with a corresponding development port to read encrypted or non-encrypted data from the first memory location 302.

The read/write bus 308 may allow the security subsystem 112 to write encrypted or non-encrypted data to the first memory location 302. It may also allow the security subsystem 112 to read encrypted or non-encrypted data from the second memory location 304.

In various embodiments, the dedicated password exchange mailbox 300 may utilize other mechanisms to allow a development tool to read and write to the dedicated password exchange mailbox 300 and to allow the security subsystem 112 to read and write to the dedicated password exchange mailbox 300.

The dedicated password exchange mailbox 300 may also provide an interrupt signal in communication with the first memory location 302 and the second memory location 304. The interrupt signal may be delivered at interface 300C to a bus that is coupled with the security subsystem 112. The interrupt signal may be triggered when data is read from the first memory location 302 or written to the second memory location 304.

The development port may poll the registers of dedicated password exchange registers to determine when data has been written and read by the security subsystem.

A non-limiting example will now be discussed for illustrative purposes. In various embodiments, a core of the security subsystem 112 may write an encrypted or non encrypted challenge to the first memory location 302. The content written by the security subsystem 112 may be read (by way of port controller) by a development tool received by a corresponding port, for example the first development port 102. This may also trigger an interrupt. The development tool may then generate an encrypted or non-encrypted response to the challenge posed by the security subsystem. The response may be written (via a control port, like the first-port controller 106) to the second memory location 304. An interrupt may be generated and the security subsystem 112 may read the content and evaluate whether the authentication protocol has been passed. The data written and read during this exchange may be referred to as authentication-exchange data. The security subsystem 112 and a development tool may continue to exchange data until the development tool has been authenticated. In various embodiments, additional challenges may be issued at intervals, so the development tool is continuously authenticated. The intervals may be of predetermined length.

Figure 4:
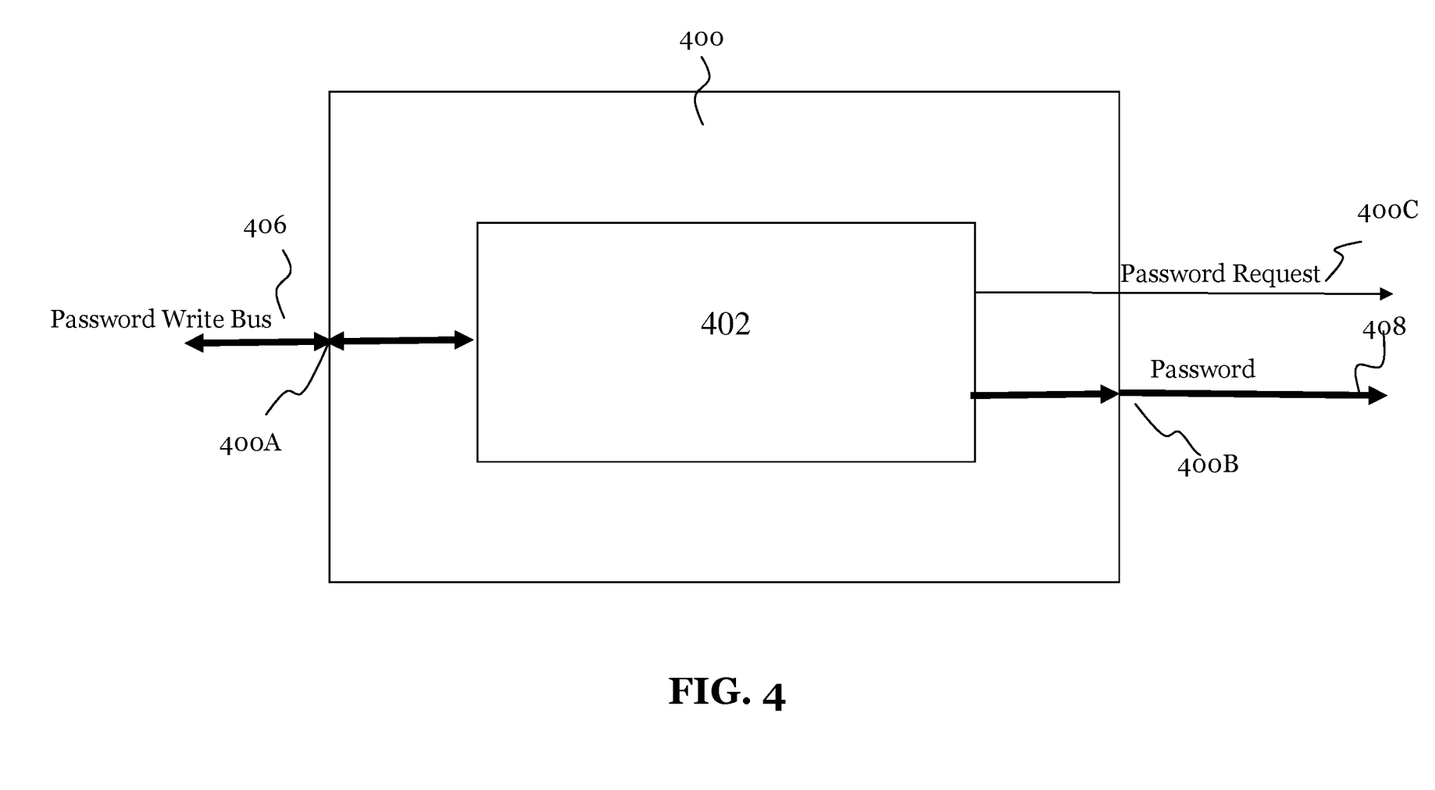
FIG. 4 depicts a static password exchange mailbox consistent with embodiments.

FIG. 4 depicts a static password exchange mailbox of an embodiment.

In various embodiments, a static password exchange mailbox 400 may comprise a set of programmable registers 402 which are used to program the one-time password. The set of programmable registers 402 may comprise 128 bits, 256 bits or other sizes. A development tool coupled with a development port may write a static password using a bus 406 connected at interface 400A. This may be accomplished via a port controller (such as the first-port controller 106 by way of read/write interface 110A or second-port controller 108 by way of read/write interface 110B). A static password may be written in programmable registers 402. The programmable registers 402 may comprise a set of control and status registers that are used to indicate when password programming in the set of programmable registers 402 has been completed. Password request 400C is set on password write completion. Password bus 408 connected at interface 400B may carry a password stored in the set of programmable registers which is provided to security subsystem 112 (for example by read/write interface 214). Upon determining that the correct password has been provided the access granted signal may be asserted via interface 210 of FIG. 2.

Figure 5:
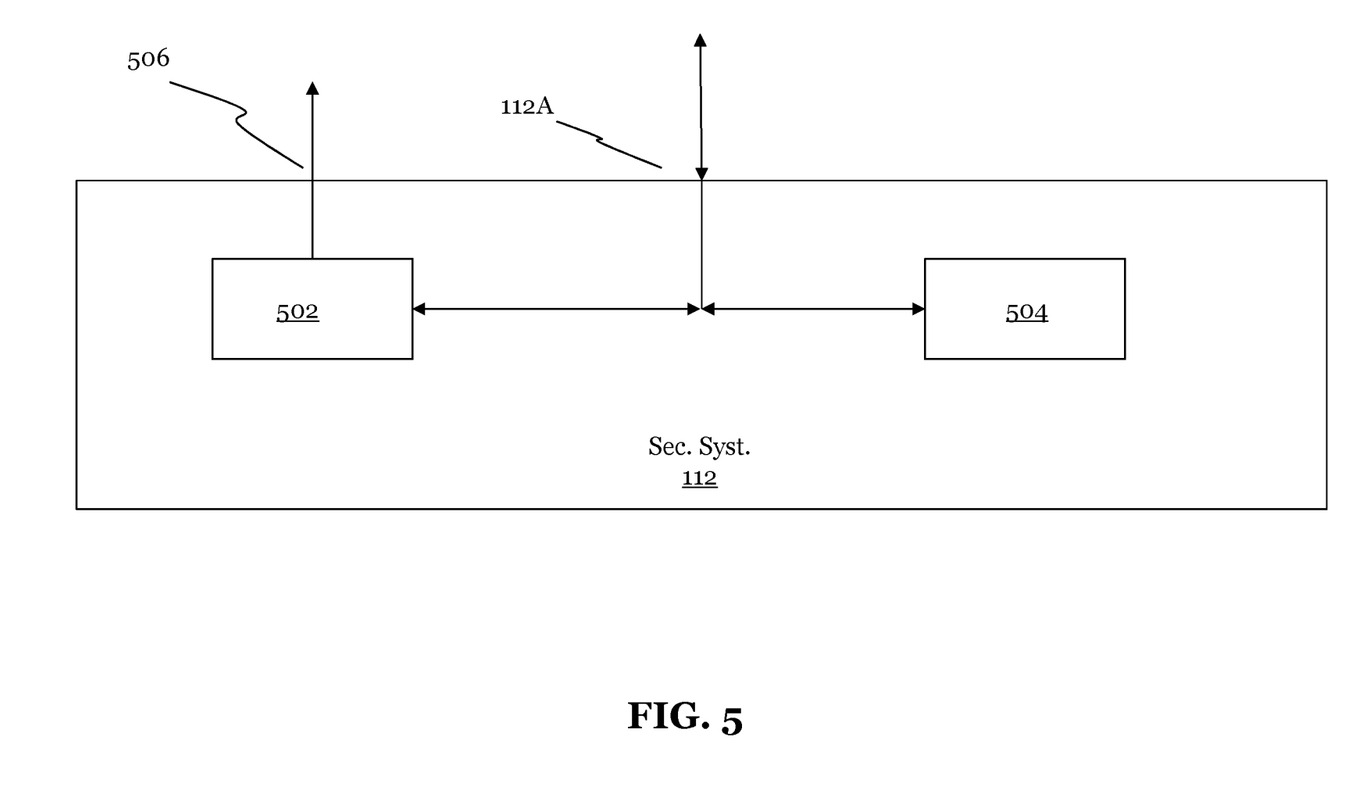
FIG. 5 depicts a security subsystem of an embodiment.

FIG. 5 depicts a security subsystem of an embodiment.

In various embodiments, a security subsystem 112 may authenticate password based on key and encryption techniques. An authenticated Development tool has information related to correctly challenge the password.

In various embodiments, the security subsystem 112 may comprise a core 502. The core may comprise an encryption engine. The security subsystem 112 may also comprise a read write interface 112A to receive and transmit signals to the central controller 110 and other SoC components. As will be appreciated, the security subsystem may comprise additional interfaces. The security subsystem 112 may comprise a memory 504. The memory 504 may be utilized to store keys for encryption. Memory 504 may also comprise a non-transitory computer readable memory. The memory 504 may store instruction sets that are executed by the core. The core 502 may generate encrypted or non-encrypted authentication-exchange data to be written to the dedicated mailboxes of the central controller 110. Such authentication-exchange data may include a challenge for a tool coupled to a development port. For example, the core may write authentication-exchange data to memory locations (such as register locations) accessible to the security subsystem like the first memory location 302 of a dedicated password exchange mailbox 300 or the memory location (programmable registers 402) of a static exchange mailbox.

The core 502 may also execute an instruction set to authenticate authentication-exchange data read from memory locations accessible to the security subsystem 112. For example, the second memory location 304 of a dedicated password exchange mailbox 300 Data read may include a response to a challenge issued by the security subsystem 112, the response being provided by a development tool. Thus, the core 502 may authenticate data provided to a dedicated password mailboxes. In various embodiments, static password exchange mailbox provides password to Security subsystem. It may then be compared inside security subsystem 112 for authentication.

In various embodiments, the core 502 may initiate an authentication sequence with a development tool paired with a development port repeatedly. Intervals between authentication sequences may be predetermined. Instructions for executing the authentication sequence may be stored in memory 504. The intervals may be timed by a clock (not depicted). The length of the interval may be determined by an instruction set stored in memory 504.

The core 502 may also assert an access-granted signal when authentication protocols are satisfied. This may be delivered to the central controller 110 by a bus or other means. In various embodiments, the access-granted signal may be asserted only when all development tools have satisfied authentication by way of a respective dedicated password mailbox and a static password authentication has been satisfied. The access-granted signal may be de-asserted if any development tools fail an authentication protocol. The access-granted signal may be provided to an output 506. In various embodiments, the access-granted signal may also be provided to the read/write interface 112A and carried on a bus.

As will be appreciated, a SoC may comprise any number of development ports. There is no limit to the number of development ports that may be included on a SoC 100. A central controller 110 may comprise a dedicated password exchange mailbox for each development port. In various embodiments, a SoC may also comprise a port controller for each development port.

Figure 6:
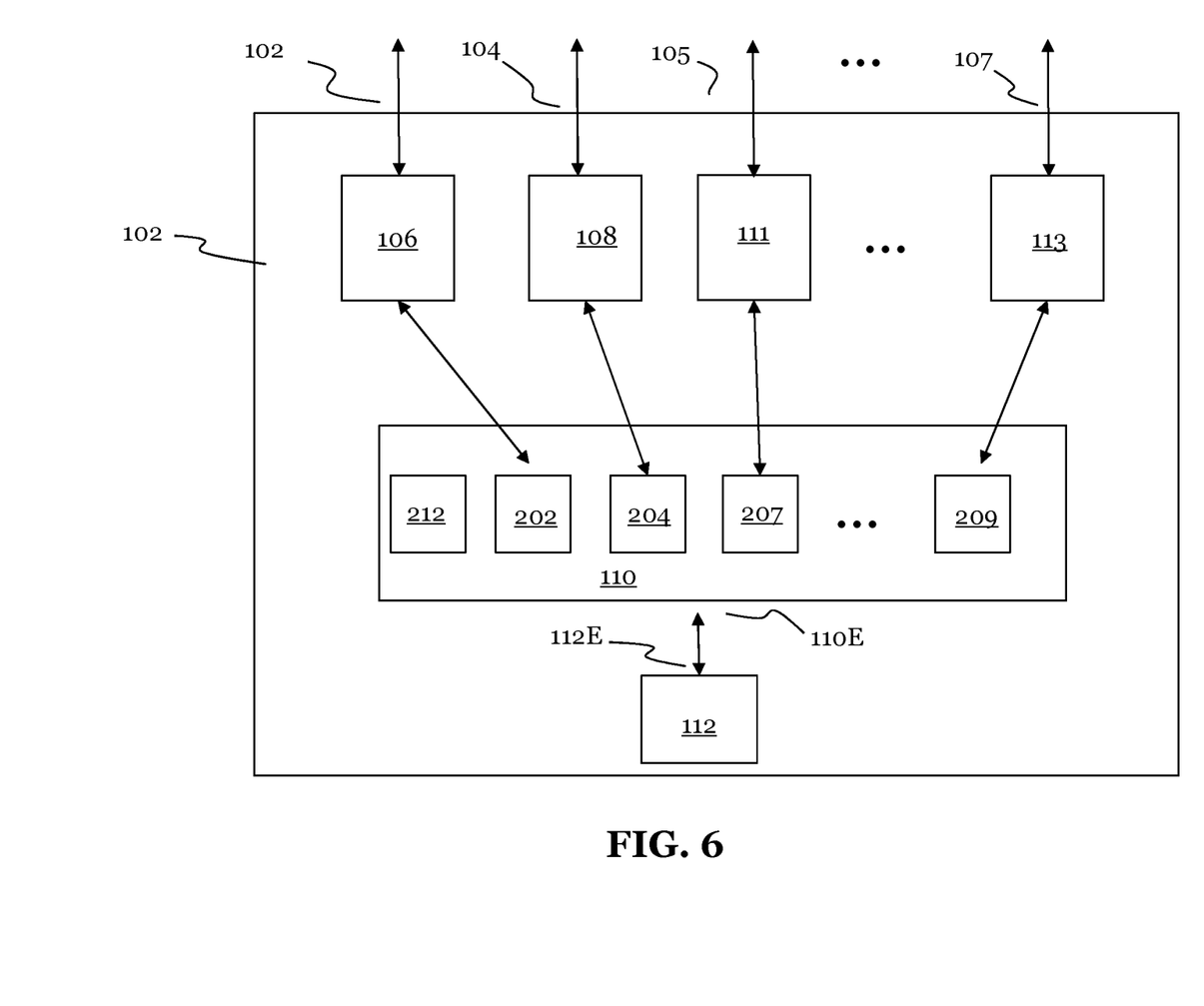
FIG. 6 depicts a multiport SoC with a central controller consistent with an embodiment.

FIG. 6 depicts a multiport SoC with a central controller consistent with an embodiment.

The SoC 100 may comprise a first development port 102, a second development port 104, a third development port 105, and an Nth development port 107. The SoC may comprise a first-port controller 106, a second-port controller 108, a third-port controller 111, and an Nth-port controller 113. The central controller 110 may comprise a first dedicated password exchange mailbox 202, a second dedicated password exchange mailbox 204, third dedicated password exchange mailbox 207, and an Nth dedicated password exchange mailbox 209. Each dedicated password exchange mailbox may be limited so it is only accessible by a corresponding port controller. The central controller 110 may comprise a static password exchange mailbox 212 that is in communication with each port controller (connections not shown in FIG. 6).

Figure 7:
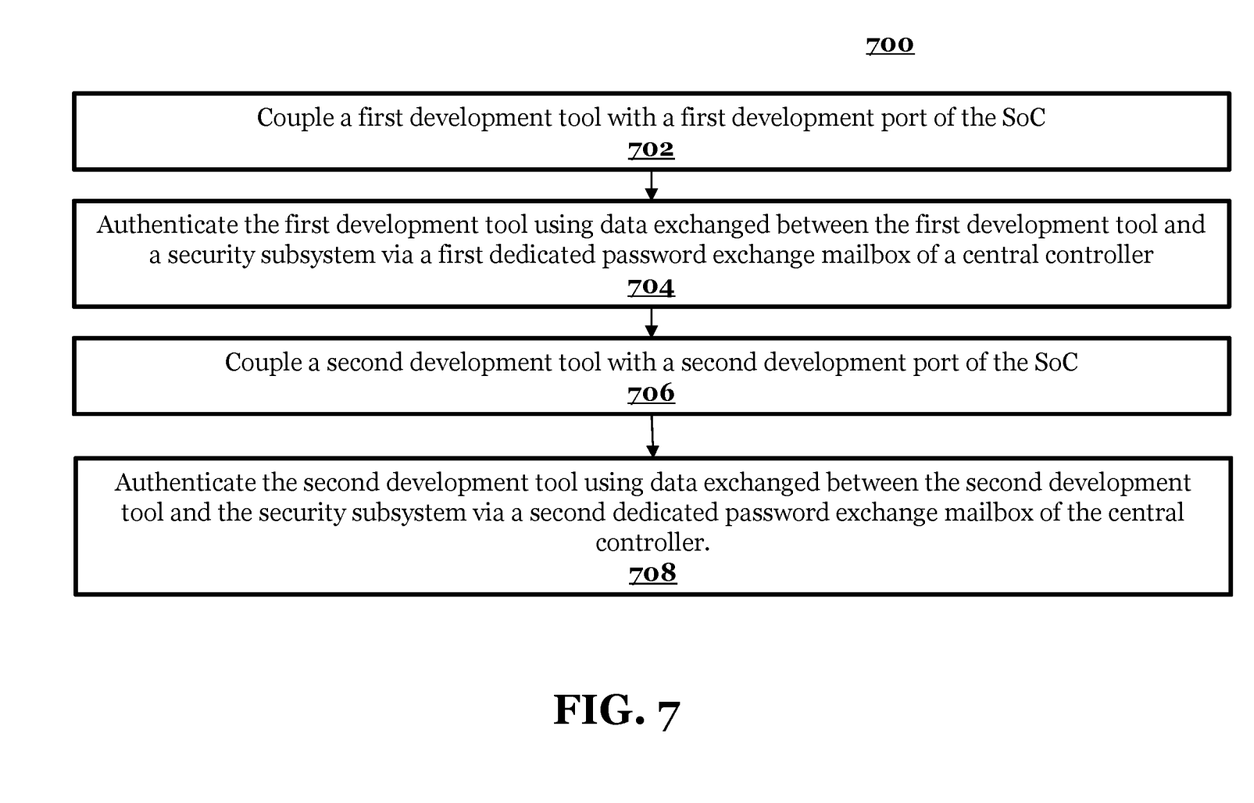
FIG. 7 depicts a flowchart for a method consistent with an embodiment.

FIG. 7 depicts a flowchart for a method consistent with an embodiment.

In various embodiments, a method 700 to authenticate development tools for a system on a chip (SoC) may comprise at a step 702, coupling a first development tool with a first development port of the SoC; at a step 704, authenticating the first development tool using data exchanged between the first development tool and a security subsystem via a first dedicated password exchange mailbox of a central controller; at a step 706, coupling a second development tool with a second development port of the SoC; and at a step 708, authenticating the second development tool using data exchanged between the second development tool and the security subsystem via a second dedicated password exchange mailbox of the central controller.

In various embodiments, the method 700 may further comprise performing a one-time authentication process using data exchanged between the first development tool and the security subsystem via a static password exchange mailbox.

In various embodiments, the method 700 may further comprise repeatedly authenticating the first development tool using data exchanged between the first development tool and the security subsystem via the first dedicated password exchange mailbox of the central controller.

In various embodiments, the method 700 may further comprise repeatedly authenticating the second development tool using data exchanged between the second development tool and the security subsystem via the second dedicated password exchange mailbox of the central controller.

In various embodiments, the method 700 may further comprise granting access to the first development tool and the second development tool to a trace and debug subsystem of the SoC in response to the first development tool and the second development tool having been authenticated.

In various embodiments, the method 700 may further comprise denying access to the first development tool and the second development tool to a trace and debug subsystem of the SoC in response to either one of the first development tool or the second development tool failing an authentication protocol.

Figure 8:
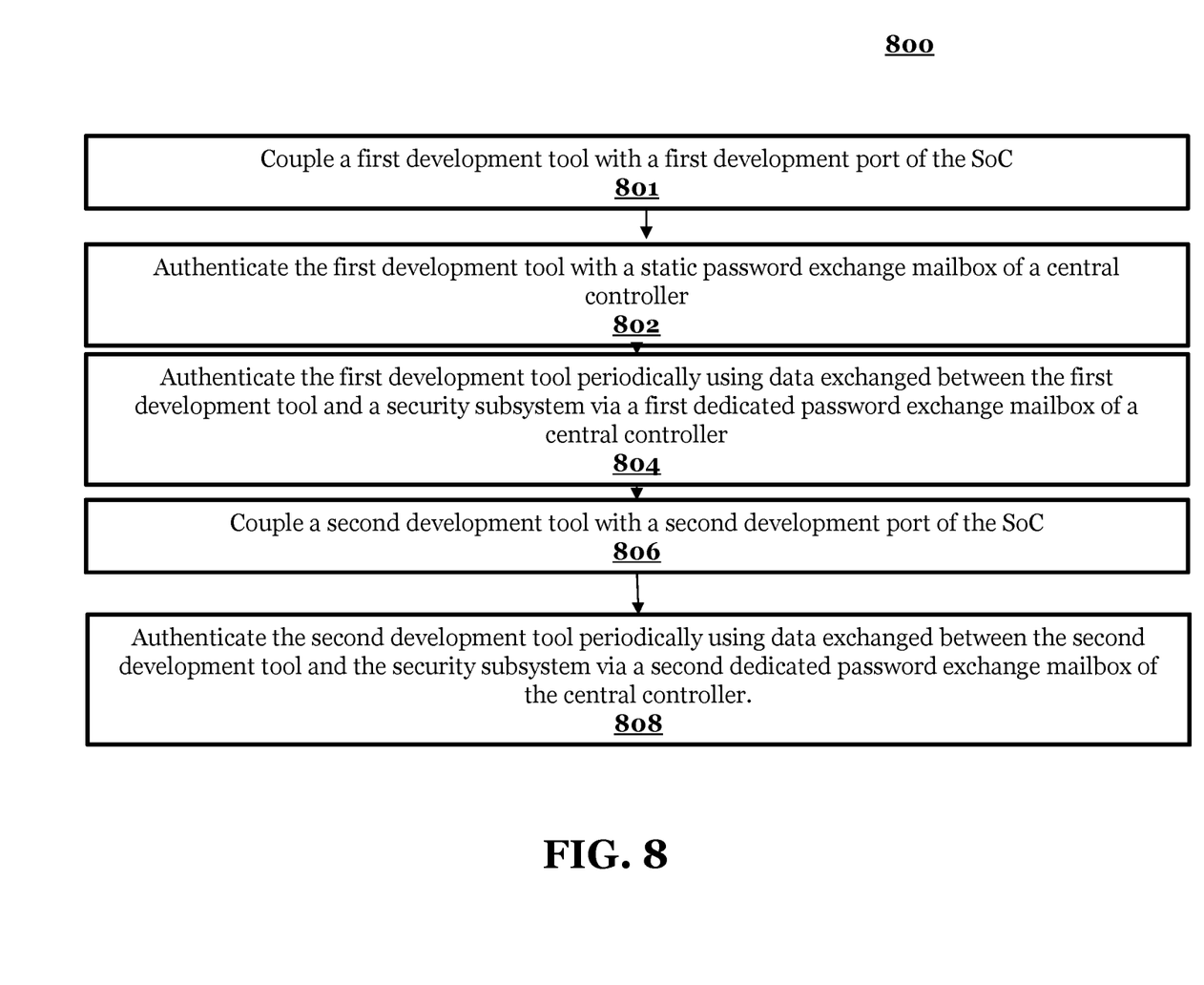
FIG. 8 depicts a flowchart for a method consistent with an embodiment.

FIG. 8 depicts a flowchart for a method consistent with an embodiment.

In various embodiments, a method 800 to authenticate development tools for a system on a chip (SoC) may comprise at a step 801, coupling a first development tool with a first development port of the SoC; at a step 802, authenticating the first development tool with a static password exchange mailbox of a central controller; at a step 804, periodically authenticate the first development tool using data exchanged between the first development tool and a security subsystem via a first dedicated password exchange mailbox of a central controller; at a step 806, coupling a second development tool with a second development port of the SoC; and at a step 808, periodically authenticate the second development tool using data exchanged between the second development tool and the security subsystem via a second dedicated password exchange mailbox of the central controller.

Example 1. A SoC comprising: a first-port controller in communication with a first development port configured to receive a first development tool; a second-port controller in communication with a second development port configured to receive a second development tool; a security subsystem; and a central controller in communication with the first-port controller, the second-port controller, and the security subsystem, the central controller being configured to manage authentication exchanges between the security subsystem and the first development tool and authentication exchanges between the security subsystem and the second development tool.

Example 2. The SoC of Example 1, wherein the central controller includes a password exchange mailbox for the first-port controller and a password exchange mailbox for the second-port controller.

Example 3. The SoC of Example 1 or Example 2, wherein the password exchange mailbox for the first-port controller includes a register location accessible to the security subsystem to write authentication-exchange data and accessible to the first development tool via the first-port controller to read authentication-exchange data.

Example 4. The SoC of Example 1-Example 3, wherein the password exchange mailbox for the first-port controller includes a register location accessible to the security subsystem to read authentication-exchange data and accessible to the first development tool via the first-port controller to write authentication-exchange data.

Example 5. The SoC of Example 1-Example 4, wherein the password exchange mailbox for the second-port controller includes a register location accessible to the security subsystem to write authentication-exchange data and accessible to the second development tool via the second-port controller to read authentication-exchange data.

Example 6. The SoC of Example 1-Example 5, wherein the password exchange mailbox for the second-port controller includes a register location accessible to the security subsystem to read authentication-exchange data and accessible to the second development tool via the second-port controller to write authentication-exchange data.

Example 7. The SoC of Example 1-Example 6, wherein the security subsystem includes a core that is configured to write authentication-exchange data to the register locations accessible to the security subsystem to write authentication-exchange data.

Example 8. The SoC of Example 1-Example 7, wherein the core is configured to authenticate authentication-exchange data read from the register locations accessible to the security subsystem to read authentication-exchange data.

Example 9. The SoC of Example 1-Example 8, wherein the core is configured to authenticate authentication-exchange data read from the register locations accessible to the security subsystem repeatedly at predetermined intervals.

Example 10. The SoC of Example 1-Example 9, wherein the central controller includes a static password exchange mailbox including a register location accessible for reading authentication-exchange data by the security subsystem and accessible for writing authentication-exchange data by both the first development tool via the first-port controller and the second development tool via the second-port controller; and a register location accessible for writing authentication-exchange data by the security subsystem and accessible for reading authentication-exchange data by both the first development tool via the first-port controller and the second development tool via the second-port controller; and wherein the core is configured to authenticate authentication-exchange data read from the static password exchange mailbox.

Example 11. The SoC of Example 1-Example 10, wherein the security subsystem includes an access-granted output to assert an access-granted signal, the access-granted signal being provided to the first-port controller and the second-port controller, the access-granted signal being de-asserted in response to any authentication-exchange data being unauthenticated.

Example 12. The SoC of Example 1-Example 11, wherein the SoC further includes a trace and debug subsystem accessible by a trace and debug interface of the first-port controller and accessible by a trace and debug interface of the second-port controller, the first-port controller and the second-port controller being configured to open their trace and debug interfaces in response to the access-granted signal being asserted.

Example 13. The SoC of Example 1-Example 12, where the security subsystem is configured to repeatedly initiate authentication exchanges with the first development tool and repeatedly initiate authentication exchanges with the second development tool.

Example 14. The SoC of Example 1-Example 14 wherein the central controller comprises an independent reset.

Example 15. A method to authenticate development tools for a system on a SoC, the method including: coupling a first development tool with a first development port of the SoC; authenticating the first development tool using data exchanged between the first development tool and a security subsystem via a first dedicated password exchange mailbox of a central controller; coupling a second development tool with a second development port of the SoC; and authenticating the second development tool using data exchanged between the second development tool and the security subsystem via a second dedicated password exchange mailbox of the central controller.

Example 16. The method of Example 15, further including performing a one-time authentication process using data exchanged between the first development tool and the security subsystem via a static password exchange mailbox.

Example 17. The method of Example 15 or Example 16, further including repeatedly authenticating the first development tool using data exchanged between the first development tool and the security subsystem via the first dedicated password exchange mailbox of the central controller.

Example 18. The method of Example 15 to Example 17, further including repeatedly authenticating the second development tool using data exchanged between the second development tool and the security subsystem via the second dedicated password exchange mailbox of the central controller.

Example 19. The method of Example 15, to Example 18, further including granting access to the first development tool and the second development tool to a trace and debug subsystem of the SoC in response to the first development tool and the second development tool having been authenticated.

Example 20. The method of Example 15, to Example 19, further including denying access to the first development tool and the second development tool to a trace and debug subsystem of the SoC in response to either one of the first development tool or the second development tool failing an authentication protocol.

Example 21. A central controller for a SoC, the central controller including: a first dedicated password exchange mailbox configured to manage authentication data exchanges between a first development tool coupled with the SoC and a security subsystem of the SoC; a second dedicated password exchange mailbox configured to manage authentication data exchanges between a second development tool coupled with the SoC and the security subsystem of the SoC; and a static password exchange mailbox to configured to manage authentication data exchanges between the first development tool and the security subsystem and manage authentication data exchanges between the second development tool and the security subsystem of the SoC.

Example 22. The central controller of the Example 21, further including an output to provide an access-granted signal, the access-granted signal being asserted in response to authentication protocols being satisfied for the first dedicated password exchange mailbox, the second dedicated password exchange mailbox, and the static password exchange mailbox.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system on a chip (SoC) comprising:
 a first-port controller in communication with a first development port configured to receive a first development tool;
 a second-port controller in communication with a second development port configured to receive a second development tool;
 a security subsystem; and
 a central controller in communication with the first-port controller, the second-port controller, and the security subsystem, the central controller being configured to manage authentication exchanges between the security subsystem and the first development tool and authentication exchanges between the security subsystem and the second development tool.

2. The SoC of claim 1, wherein the central controller comprises a password exchange mailbox for the first-port controller and a password exchange mailbox for the second-port controller.

3. The SoC of claim 2, wherein the password exchange mailbox for the first-port controller comprises a register location accessible to the security subsystem to write authentication-exchange data and accessible to the first development tool via the first-port controller to read authentication-exchange data.

4. The SoC of claim 3, wherein the password exchange mailbox for the first-port controller comprises a register location accessible to the security subsystem to read authentication-exchange data and accessible to the first development tool via the first-port controller to write authentication-exchange data.

5. The SoC of claim 4, wherein the password exchange mailbox for the second-port controller comprises a register location accessible to the security subsystem to write authentication-exchange data and accessible to the second development tool via the second-port controller to read authentication-exchange data.

6. The SoC of claim 5, wherein the password exchange mailbox for the second-port controller comprises a register location accessible to the security subsystem to read authentication-exchange data and accessible to the second development tool via the second-port controller to write authentication-exchange data.

7. The SoC of claim 6, wherein the security subsystem comprises a core that is configured to write authentication-exchange data to the register locations accessible to the security subsystem to write authentication-exchange data.

8. The SoC of claim 7, wherein the core is configured to authenticate authentication-exchange data read from the register locations accessible to the security subsystem to read authentication-exchange data.

9. The SoC of claim 8, wherein the core is configured to authenticate authentication-exchange data read from the register locations accessible to the security subsystem repeatedly at predetermined intervals.

10. The SoC of claim 9, wherein the central controller comprises a static password exchange mailbox comprising:
 a register location accessible for reading authentication-exchange data by the security subsystem and accessible for writing authentication-exchange data by both the first development tool via the first-port controller and the second development tool via the second-port controller; and
 a register location accessible for writing authentication-exchange data by the security subsystem and accessible for reading authentication-exchange data by both the first development tool via the first-port controller and the second development tool via the second-port controller; and
 wherein the core is configured to authenticate authentication-exchange data read from the static password exchange mailbox.

11. The SoC of claim 10, wherein the security subsystem comprises an access-granted output to assert an access-granted signal, the access-granted signal being provided to the first-port controller and the second-port controller, the access-granted signal being de-asserted in response to any authentication-exchange data being unauthenticated.

12. The SoC of claim 11, wherein the SoC further comprises a trace and debug subsystem accessible by a trace and debug interface of the first-port controller and accessible by a trace and debug interface of the second-port controller, the first-port controller and the second-port controller being configured to open their trace and debug interfaces in response to the access-granted signal being asserted.

13. The SoC of claim 12, where the security subsystem is configured to repeatedly initiate authentication exchanges with the first development tool and repeatedly initiate authentication exchanges with the second development tool.

14. The SoC of claim 1, wherein the central controller comprises an independent reset.

15. A method to authenticate development tools for a system on a chip (SoC), the method comprising:
    coupling a first development tool with a first development port of the SoC;
    authenticating the first development tool using data exchanged between the first development tool and a security subsystem via a first dedicated password exchange mailbox of a central controller;
    coupling a second development tool with a second development port of the SoC; and
    authenticating the second development tool using data exchanged between the second development tool and the security subsystem via a second dedicated password exchange mailbox of the central controller.

16. The method of claim 15, further comprising performing a one-time authentication process using data exchanged between the first development tool and the security subsystem via a static password exchange mailbox.

17. The method of claim 15, further comprising repeatedly authenticating the first development tool using data exchanged between the first development tool and the security subsystem via the first dedicated password exchange mailbox of the central controller.

18. The method of claim 15, further comprising repeatedly authenticating the second development tool using data exchanged between the second development tool and the security subsystem via the second dedicated password exchange mailbox of the central controller.

19. The method of claim 15, further comprising granting access to the first development tool and the second development tool to a trace and debug subsystem of the SoC in response to the first development tool and the second development tool having been authenticated.

20. The method of claim 15, further comprising denying access to the first development tool and the second development tool to a trace and debug subsystem of the SoC in response to either one of the first development tool or the second development tool failing an authentication protocol.

21. A central controller for a System on a Chip (SoC), the central controller comprising:
    a first dedicated password exchange mailbox configured to store authentication data exchanges between a first development tool coupled with the SoC and a security subsystem of the SoC;
    a second dedicated password exchange mailbox configured to store authentication data exchanges between a second development tool coupled with the SoC and the security subsystem of the SoC; and
    a static password exchange mailbox configured to store manage authentication data exchanges between the first development tool and the security subsystem and manage authentication data exchanges between the second development tool and the security subsystem of the SoC.

22. The central controller of claim 21, further comprising an output to provide an access-granted signal, the access-granted signal being asserted in response to authentication protocols being satisfied for the first dedicated password exchange mailbox, the second dedicated password exchange mailbox, and the static password exchange mailbox.

* * * * *